(12) United States Patent
Lee et al.

(10) Patent No.: US 10,573,930 B2
(45) Date of Patent: Feb. 25, 2020

(54) ELECTROLYTE CONTAINING POLYDOPAMINE AND LITHIUM-SULFUR BATTERY INCLUDING SAME

(71) Applicants: LG CHEM, LTD., Seoul (KR); KOREA ADVANCED INSTITUTE OF SCIENCE AND TECHNOLOGY, Daejeon (KR)

(72) Inventors: Seong Ho Lee, Daejeon (KR); Haeshin Lee, Daejeon (KR); Sun Jin Kim, Guri-si (KR); Doo Kyung Yang, Daejeon (KR); Ki Young Kwon, Daejeon (KR); In Tae Park, Daejeon (KR)

(73) Assignees: LG CHEM, LTD., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/776,006

(22) PCT Filed: Jan. 13, 2017

(86) PCT No.: PCT/KR2017/000481
§ 371 (c)(1),
(2) Date: May 14, 2018

(87) PCT Pub. No.: WO2017/191883
PCT Pub. Date: Nov. 9, 2017

(65) Prior Publication Data
US 2018/0331391 A1 Nov. 15, 2018

(30) Foreign Application Priority Data
May 2, 2016 (KR) .................. 10-2016-0054164

(51) Int. Cl.
*H01M 10/0567* (2010.01)
*H01M 10/0568* (2010.01)
(Continued)

(52) U.S. Cl.
CPC ...... *H01M 10/0567* (2013.01); *C08G 61/124* (2013.01); *H01M 10/052* (2013.01);
(Continued)

(58) Field of Classification Search
CPC ....... H01M 2300/0025; H01M 10/052; H01M 10/0567; H01M 10/0568; H01M 10/0569; C08G 61/124; C08G 2261/31
See application file for complete search history.

(56) References Cited

U.S. PATENT DOCUMENTS 9,437,871 B2 9/2016 Zhou et al.
2013/0302666 A1 11/2013 Park et al.
(Continued)

FOREIGN PATENT DOCUMENTS

CN 104617327 A 5/2015
CN 104795544 A 7/2015
(Continued)

OTHER PUBLICATIONS

"Research progress of large-capacity long-life lithium-ion battery electrode materials at Suzhou Nano Institute", (Source: Suzhou Institute of Nanotechnology and Nano-Bionics, Release time: Nov. 15, 2013), total of 7 pages.
(Continued)

*Primary Examiner* — Brittany L Raymond
(74) *Attorney, Agent, or Firm* — Birch, Stewart, Kolasch & Birch, LLP

(57) ABSTRACT

The present invention relates to an electrolyte containing a polydopamine and a lithium-sulfur battery including the same and, more particularly, to a technique in which poly-
(Continued)

dopamine contained in an electrolyte adsorbs a lithium polysulfide eluted from a positive electrode of a lithium-sulfur battery. When using an electrolyte, according to the present invention, to which polydopamine particles are added, the polydopamine particles dispersed in the electrolyte act to adsorb lithium polysulfide eluted from a positive electrode during the charging and discharging, and thus can suppress the diffusion thereof, i.e., suppress a shuttle reaction, thereby improving the capacity and lifetime characteristics of the lithium-sulfur battery.

7 Claims, 4 Drawing Sheets

(51) Int. Cl.
H01M 10/0569 (2010.01)
H01M 10/052 (2010.01)
C08G 61/12 (2006.01)
(52) U.S. Cl.
CPC ... H01M 10/0568 (2013.01); H01M 10/0569 (2013.01); *C08G 2261/31* (2013.01); *H01M 2300/0025* (2013.01)

(56) References Cited

U.S. PATENT DOCUMENTS

| | | | |
|---|---|---|---|
| 2015/0056517 A1* | 2/2015 | Zhou | H01M 10/0525 429/310 |
| 2015/0221935 A1 | 8/2015 | Zhou et al. | |
| 2015/0318551 A1 | 11/2015 | Netz | |

FOREIGN PATENT DOCUMENTS

| | | |
|---|---|---|
| KR | 10-1190364 B1 | 10/2012 |
| KR | 10-2013-0012492 A | 2/2013 |
| KR | 10-1261703 B1 | 5/2013 |
| KR | 10-2013-0099463 A | 9/2013 |
| KR | 10-2013-0118264 A | 10/2013 |
| KR | 10-1378046 B1 | 3/2014 |
| KR | 10-1403734 B1 | 6/2014 |
| KR | 10-2014-0142038 A | 12/2014 |
| KR | 10-1510079 B1 | 4/2015 |
| KR | 10-1588616 B1 | 1/2016 |

OTHER PUBLICATIONS

International Search Report for PCT/KR2017/000481 (PCT/ISA/210) dated Apr. 18, 2017.
Lee et al., "Dopamine as a Novel Electrolyte Additive for High-Voltage Lithium-Ion Batteries", ACS Applied Materials & Interfaces, total of 7 pages.
Oh et al., "Mussel-inspired polydopamine-treated composite electrolytes for long-term operations of polymer electrolyte membrane fuel cells", Journal of Materials Chemistry A, 2013, 1, pp. 14484-14490.
Wang et al., "Interface Chemistry Guided Long-Cycle-Life Li-S Battery", Nano Letters, 2013 American Chemical Society, 13, pp. 4206-4211.
Zhang et al., "Polydopamine-coated separator for high-performance lithium-sulfur batteries", Journal of Solid State Electrochemistry (2015), vol. 19, No. 6, pp. 1709-1715.
European Search Report for Appl. No. 17792786.0 dated Jun. 29, 2018.
Wang, L., et al, "Interface Chemistry Guided Long-Cycle-Life Li-S Battery," Nano Letters, 2013, vol. 13, pp. 4206-4211.

* cited by examiner

【Figure 1】
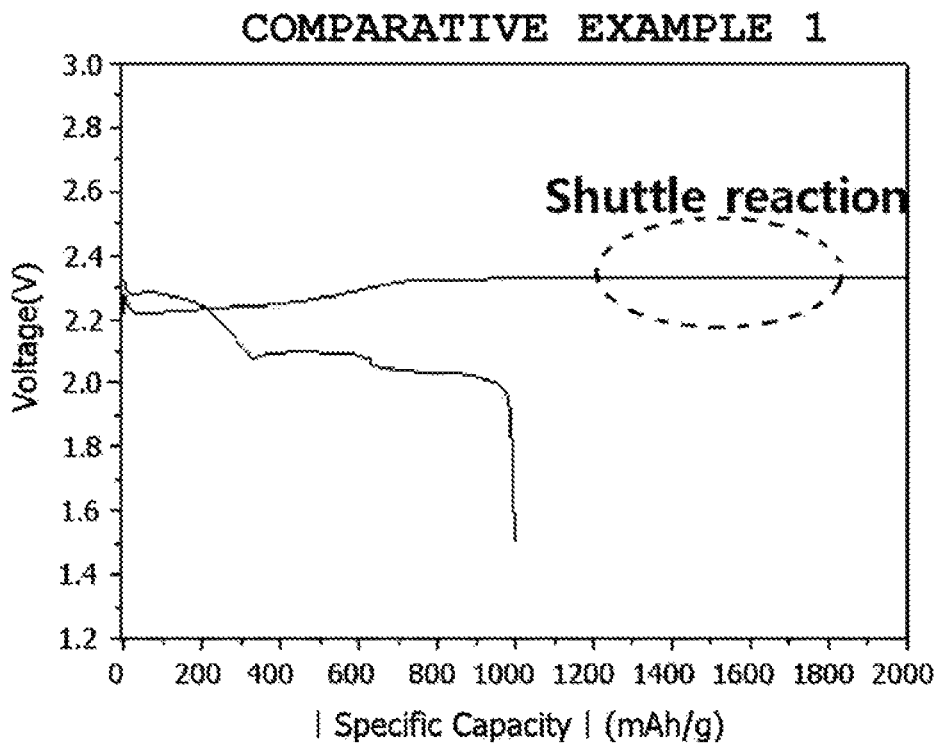
【Figure 2】
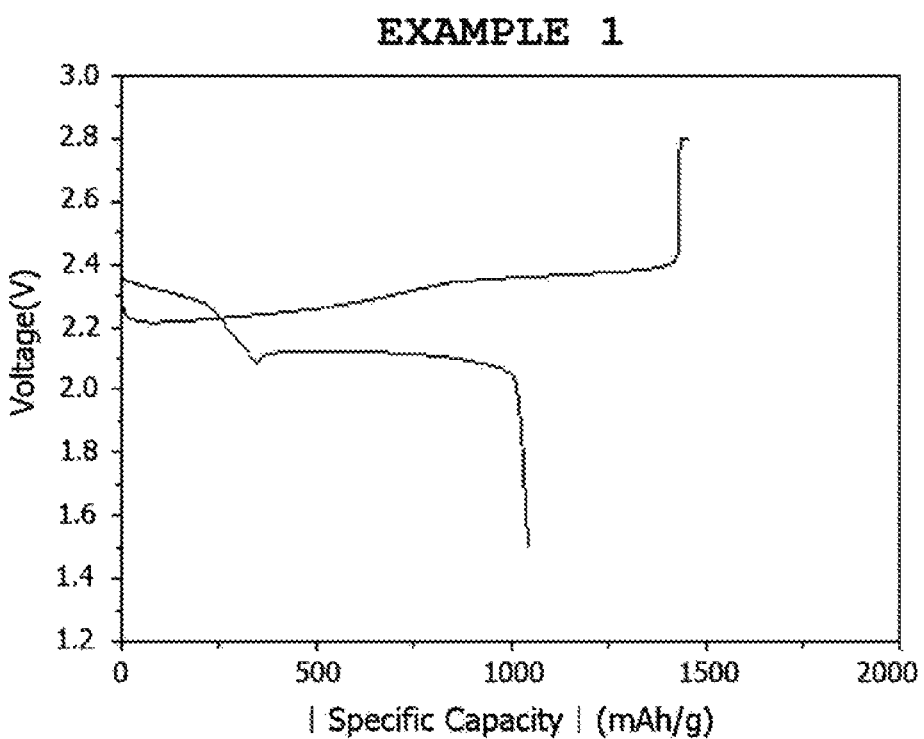

【Figure 3】
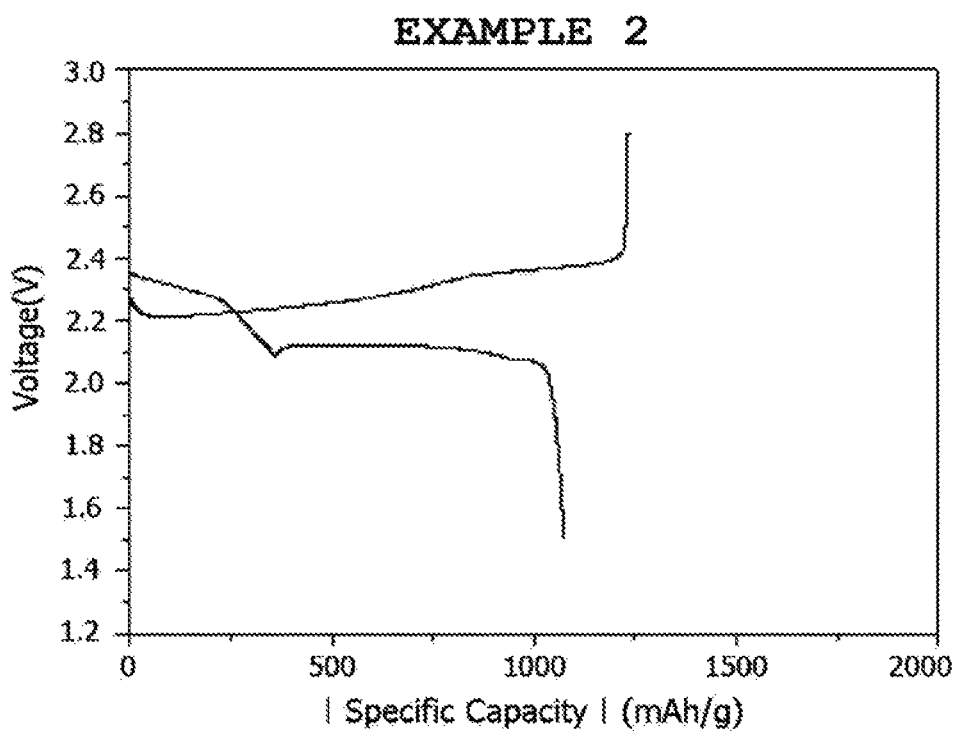
【Figure 4】
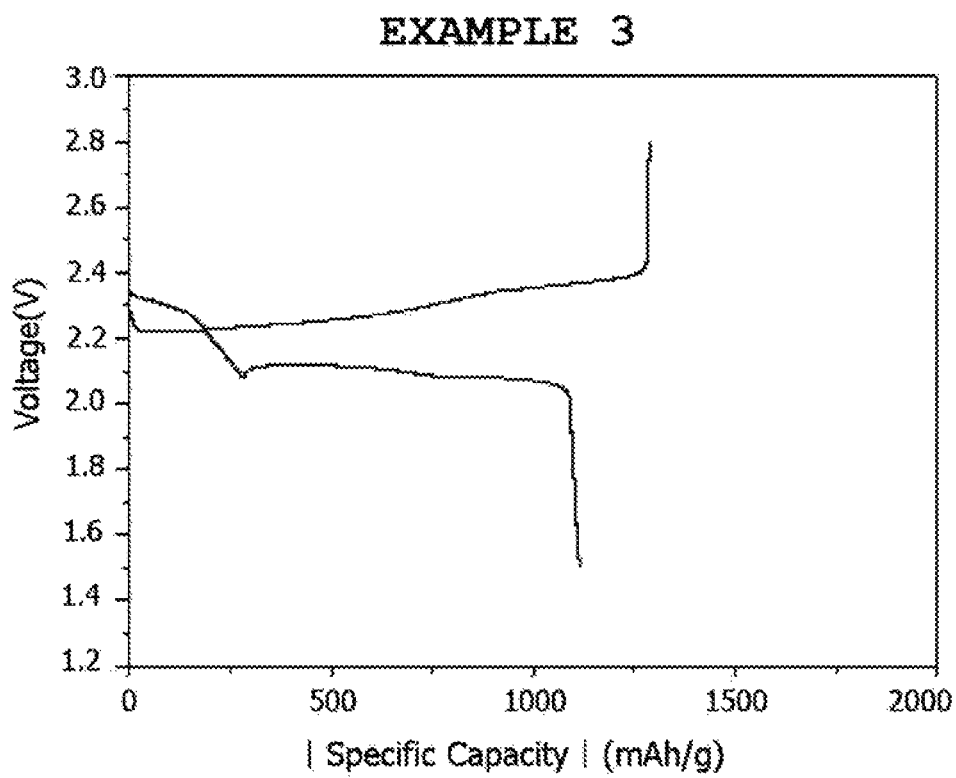

[Figure 5]
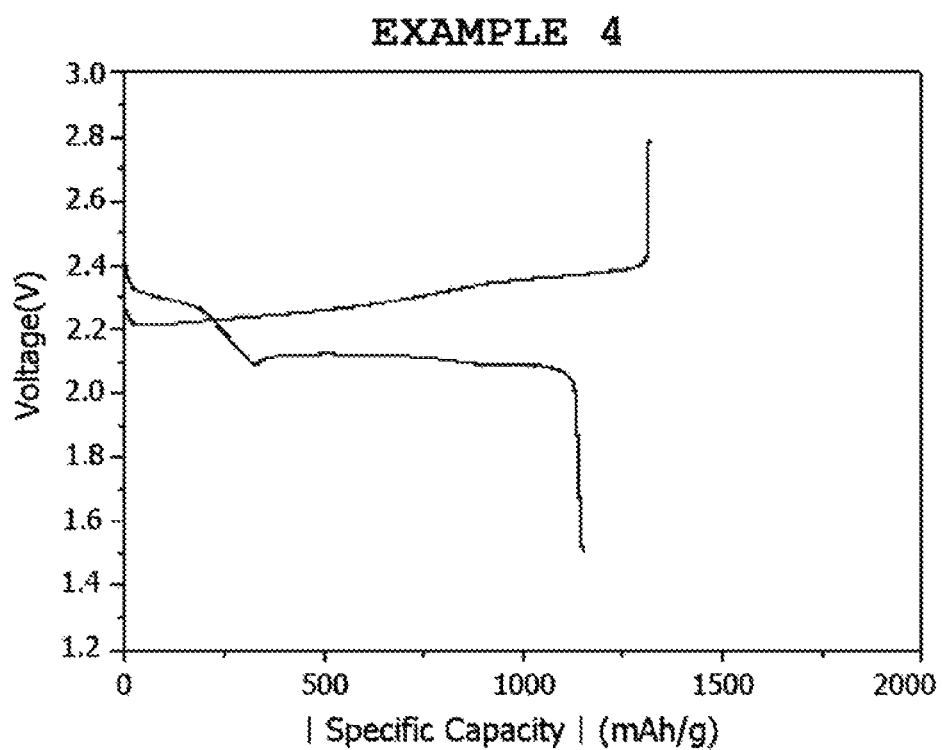

【Figure 6】
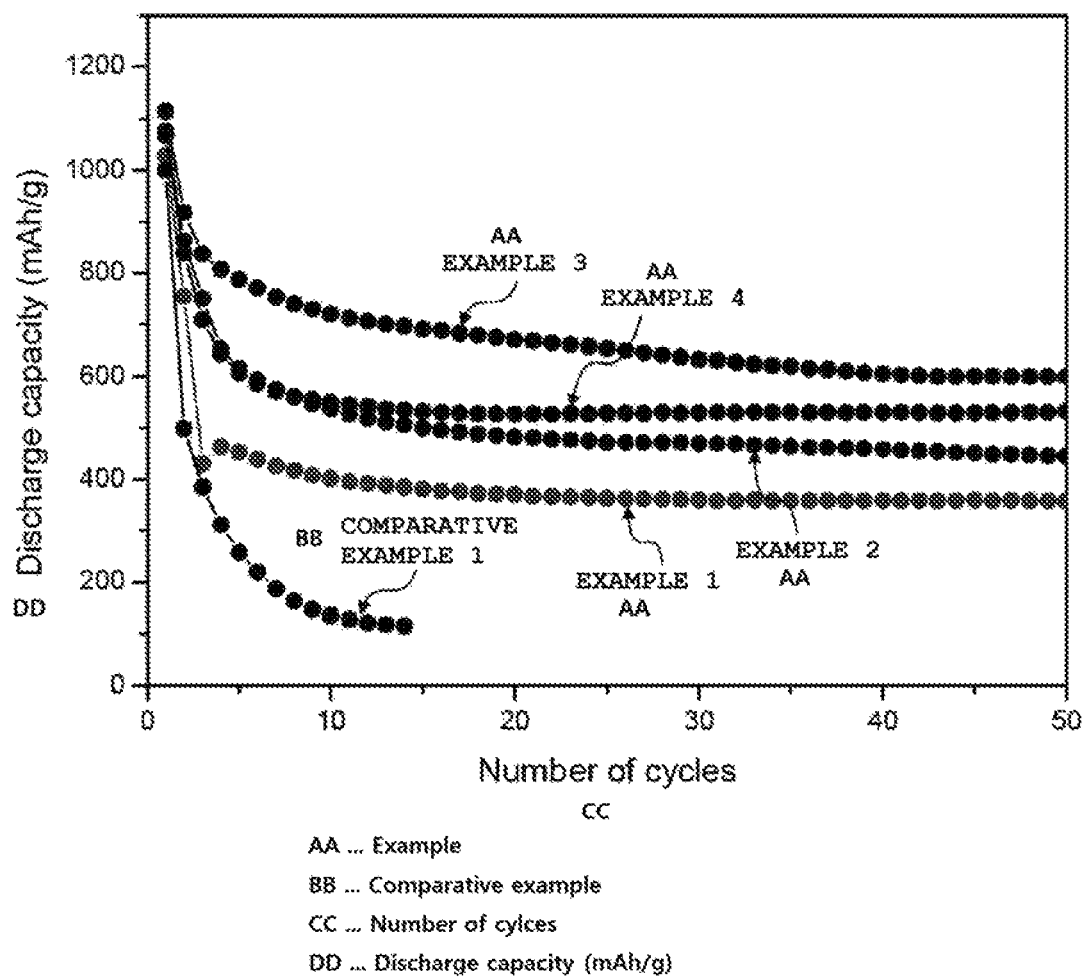

ELECTROLYTE CONTAINING POLYDOPAMINE AND LITHIUM-SULFUR BATTERY INCLUDING SAME

TECHNICAL FIELD

This application claims priority to and the benefits of Korean Patent Application No. 10-2016-0054164, filed with the Korean Intellectual Property Office on May 2, 2016, the entire contents of which are incorporated herein by reference.

The present invention relates to a liquid electrolyte including polydopamine and a lithium-sulfur battery including the same, and in particular, to a technology of polydopamine included in a liquid electrolyte adsorbing lithium polysulfide eluted from a positive electrode of a lithium-sulfur battery.

BACKGROUND ART

As electronic goods, electronic devices, communication devices and the like have rapidly become smaller and lighter recently, and necessity of electric vehicles has highly emerged regarding environmental problems, demands for improving performance of secondary batteries used as a power source of these goods have greatly increased. Among these, lithium batteries have received considerable attention as a high performance battery due to their high energy density and high standard electrode potential.

Particularly, lithium-sulfur (Li—S) batteries are a secondary battery using a sulfur series material having sulfur-sulfur (S—S) bonds as a positive electrode active material, and using lithium metal as a negative electrode active material. Sulfur, a main material of a positive electrode active material, has advantages of being very abundant in resources, having no toxicity and having a low atomic weight. In addition, a lithium-sulfur battery has theoretical discharge capacity of 1675 mAh/g-sulfur and theoretical energy density of 2,600 Wh/kg, which is very high compared to theoretical energy density of other battery systems (Ni-MH battery: 450 Wh/kg, Li—FeS battery: 480 Wh/kg, Li—$MnO_2$ battery: 1,000 Wh/kg, Na—S battery: 800 Wh/kg) currently studied, and therefore, is a most promising battery among batteries that have been developed so far.

During a discharge reaction of a lithium-sulfur (Li—S) battery, an oxidation reaction of lithium occurs in a negative electrode (anode), and a reduction reaction of sulfur occurs in a positive electrode (cathode). Sulfur has a cyclic $S_8$ structure before discharge, and electric energy is stored and produced using an oxidation-reduction reaction in which an oxidation number of S decreases as S—S bonds are broken during a reduction reaction (discharge), and an oxidation number of S increases as S—S bonds are formed again during an oxidation reaction (charge). During such a reaction, the sulfur is converted to linear-structured lithium polysulfide ($Li_2S_x$, x=8, 6, 4 and 2) from cyclic $S_8$ by the reduction reaction, and as a result, lithium sulfide ($Li_2S$) is lastly produced when such lithium polysulfide is completely reduced. By the process of being reduced to each lithium polysulfide, a discharge behavior of a lithium-sulfur (Li—S) battery shows gradual discharging voltages unlike lithium ion batteries.

Among lithium polysulfide such as $Li_2S_8$, $Li_2S_6$, $Li_2S_4$ and $Li_2S_2$, lithium polysulfide having a high sulfur oxidation number ($Li_2S_x$, commonly x>4) is particularly readily dissolved in a hydrophilic liquid electrolyte. Lithium polysulfide dissolved in the liquid electrolyte is diffused away from a lithium polysulfide-produced positive electrode due to a concentration difference. Lithium polysulfide eluted from the positive electrode as above is washed away out of the positive electrode reaction area making it impossible to be gradually reduced to lithium sulfide ($Li_2S$). In other words, lithium polysulfide present in a dissolved state outside the positive electrode and the negative electrode is not able to participate in charge and discharge reactions of a battery, and therefore, the sulfur material amount participating in an electrochemical reaction in the positive electrode decreases, and as a result, it becomes a main factor causing charge capacity reduction and energy reduction of a lithium-sulfur battery.

Furthermore, apart from those floating or immersed in the liquid electrolyte, lithium polysulfide diffusing to the negative electrode directly reacts with lithium and is fixed on the negative electrode surface in a $Li_2S$ form, which causes a problem of corroding the lithium metal negative electrode.

In order to minimize such lithium polysulfide elution, studies on changing morphology of a positive electrode composite filling various carbon structures with sulfur particles have been ongoing, however, such methods are complicated in the preparation and have not resolved fundamental problems.

DISCLOSURE

Technical Problem

As described above, lithium-sulfur batteries have had a problem in that battery capacity and lifecycle properties decline as charge and discharge cycles progress due to lithium polysulfide eluted and diffused from a positive electrode.

Accordingly, an aspect of the present invention provides a liquid electrolyte for a lithium-sulfur battery suppressing elution and diffusion of lithium polysulfide.

Another aspect of the present invention provides a lithium-sulfur battery including the liquid electrolyte.

Technical Solution

According to an aspect of the present invention, there is provided a liquid electrolyte for a lithium-sulfur battery including polydopamine.

According to another aspect of the present invention, there is provided a lithium-sulfur battery including the same.

Advantageous Effects

When using a polydopamine-added liquid electrolyte according to an aspect of the present invention, polydopamine particles dispersed into the liquid electrolyte perform a role of adsorbing lithium polysulfide eluted from a positive electrode during charge and discharge, and therefore, lithium-sulfur battery capacity and lifecycle properties can be enhanced by suppressing diffusion of the lithium polysulfide, that is, suppressing a shuttle reaction.

DESCRIPTION OF DRAWINGS

FIG. 1 is a charge and discharge graph of a lithium-sulfur battery formed with a liquid electrolyte that does not include polydopamine particles according to Comparative Example 1 of the present invention.

FIG. 2 is a charge and discharge graph of a lithium-sulfur battery formed with a liquid electrolyte including polydopamine particles in 0.1% by weight according to Example 1 of the present invention.

FIG. 3 is a charge and discharge graph of a lithium-sulfur battery formed with a liquid electrolyte including polydopamine particles in 0.25% by weight according to Example 2 of the present invention.

FIG. 4 is a charge and discharge graph of a lithium-sulfur battery formed with a liquid electrolyte including polydopamine particles in 0.5% by weight according to Example 3 of the present invention.

FIG. 5 is a charge and discharge graph of a lithium-sulfur battery formed with a liquid electrolyte including polydopamine particles in 1.0% by weight according to Example 4 of the present invention.

FIG. 6 is a graph showing a cycle-dependent discharge cycle property of lithium-sulfur batteries according to Comparative Example 1 and Examples 1 to 4 of the present invention.

BEST MODE

Hereinafter, embodiments of the invention will be described in detail with reference to the accompanying drawings so that those skilled in the art readily implement the present disclosure. However, the present invention may be implemented in various different aspects and is not limited to the embodiments described below.

Liquid Electrolyte for Lithium-Sulfur Battery

The present invention discloses a liquid electrolyte for a lithium-sulfur battery including polydopamine. Specifically, the liquid electrolyte for a lithium-sulfur battery according to the present invention is a non-aqueous liquid electrolyte including polydopamine, and is formed including polydopamine, a lithium salt and a non-aqueous liquid component.

Dopamine is, as a monomer form of polydopamine, well-known as a neurotransmitter, and is a mimicking molecule of a 3,4-dihydroxy-L-phenylalanine (L-DOPA) molecule discovered in Mussels in the sea. Particularly, polydopamine produced by oxidant-induced self-polymerization and electrochemical polymerization of dopamine has catechol, amine and imine functional groups, and forms very strong bonds not only in organic matters such as biomaterials or synthetic polymers but also on solid surfaces such as battery electrodes or separators, and therefore, surface reforming, surface modification, self-assembled multilayer formation, nanocomposite thin film formation and the like may be obtained. The catechol functional group of dopamine is readily oxidized under the presence of oxygen and may form polydopamine by self-polymerization.

Specifically, dopamine has been used as being dissolved in a low-priced and environmental-friendly distilled water-based buffer solution (10 mM tris buffer solution) instead of in a high-priced and environmental-unfriendly ordinary organic solvent, and this is due to the fact that the solution needs to be steadily maintained in a weak basic (for example pH 8.5) state in order for the dopamine to form polydopamine, a mussel-derived polymer, through spontaneous polymerization.

In the present invention, such polydopamine is preferably included in a liquid electrolyte of a lithium-sulfur battery in a particle form. Such polydopamine particles may be prepared into powders by stirring a mixed solution dissolving dopamine or a derivative thereof therein, and then washing and drying the result.

Herein, an average particle diameter of the prepared polydopamine may be controlled by adjusting a pH of the mixed solution including dopamine. As one example, the polydopamine may be prepared to have particle diameters in a 100 nm to 800 nm range by adding tris($NH_2C(CH_2OH)_3$) or sodium hydroxide (NaOH). More preferably, particles having an average particle diameter in a 200 nm to 600 nm range are used as the polydopamine introduced to the liquid electrolyte for a lithium-sulfur battery of the present invention. When the average particle diameter is less than 200 nm, process conditions are particular, and when the average particle diameter is greater than 600 nm, a surface area capable of adsorbing lithium polysulfide decreases leading to a problem of reducing adsorption efficiency.

The polydopamine is preferably included in 0.1% by weight to 1.0% by weight based on the total weight of the whole liquid electrolyte, and when included in less than 0.1% by weight, the lithium polysulfide adsorption effect of the polydopamine may not be secured, and when included in greater than 1.0% by weight, the polydopamine particles act as resistance causing a problem of reducing electrical efficiency.

A lithium salt of the present invention is a material favorable to be dissolved in a non-aqueous organic solvent, and examples thereof may include one or more selected from the group consisting of LiCl, LiBr, LiI, $LiClO_4$, $LiBF_4$, $LiB_{10}Cl_{10}$, $LiB(Ph)_4$, $LiPF_6$, $LiCF_3SO_3$, $LiCF_3CO_2$, $LiAsF_6$, $LiSbF_6$, $LiAlCl_4$, $LiSO_3CH_3$, $LiSO_3CF_3$, LiSCN, $LiC(CF_3SO_2)$ LiN $(CF_3SO_2)_2$, $LiNO_3$, chloroborane lithium, lower aliphatic carboxylic acid lithium, lithium tetraphenylborate and lithium imide.

The concentration of the lithium salt may be from 0.2 M to 4 M, specifically from 0.3 M to 2 M, more specifically from 0.3 M to 1.5 M depending on various factors such as an accurate composition of the liquid electrolyte mixture, solubility of the salt, conductivity of the dissolved salt, charge and discharge conditions of a battery, a working temperature, and other factors known in the lithium battery field. When used in less than 0.2 M, conductivity of the liquid electrolyte may decrease causing decline in the liquid electrolyte performance, and when used in greater than 4 M, viscosity of the liquid electrolyte increases leading to a decrease in the lithium ion ($Li^+$) mobility.

The non-aqueous organic solvent needs to favorably dissolve the lithium salt, and examples of the non-aqueous organic solvent of the present invention may include aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxy ethane, tetrahydroxy franc, 2-methyl tetrahydrofuran, dimethyl sulfoxide, 1,3-dioxolane, 4-methyl-1,3-dioxene, diethyl ether, formamide, dimethylformamide, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate, and the organic solvent may be used either alone or as a mixture of two or more organic solvents.

To the liquid electrolyte of the present invention, for example, pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride and the like may be added for the purpose of improving charge and discharge properties, flame retardancy and the like. In some cases, halogen-including solvents such as tetrachlorocarbon or trifluoroethylene may be further included in order to provide nonflammability, carbon dioxide gas may be further included for enhancing a high temperature storage property, and fluoro-ethylene carbonate (FEC), propene sultone (PRS), fluoro-propylene carbonate (FPC) or the like may be further included.

Lithium-Sulfur Battery

A positive electrode according to the present invention is a positive electrode of a lithium-sulfur battery, and may include a positive electrode active material layer and a positive electrode current collector for supporting the positive electrode active material layer.

The positive electrode active material may include elemental sulfur (S8), sulfur series compounds or mixtures thereof. The sulfur series compound may specifically be $Li_2S_n(n \geq 1)$, an organosulfur compound, a carbon-sulfur polymer $((C_2S_x)_n: x=2.5$ to $50, n \geq 12)$ or the like. These may be used as a composite with a conductor since sulfur materials alone do not have electrical conductivity.

The conductor may be porous. Accordingly, as the conductor, those having porosity and conductivity may be used without limit, and for example, carbon-based materials having porosity may be used. As such carbon-based materials, carbon black, graphite, graphene, active carbon, carbon fiber and the like may be used. In addition, metallic fibers such as metal mesh; metallic powders such as copper, silver, nickel and aluminum; or organic conductive materials such as polyphenylene derivatives may also be used. The conductive materials may be used either alone or as a mixture.

A binder may include a thermoplastic resin or a thermosetting resin. For example, polyethylene, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoro ethylene copolymer, an ethylene-acrylic acid copolymer and the like may be used either alone or as a mixture, however, the binder is not limited thereto, and those capable of being used as a binder in the art may all be used.

As the positive electrode current collector, those capable of being used as a current collector in the art may all be used, and specifically, using foamed aluminum, foamed nickel or the like having excellent conductivity may be preferred.

Such a positive electrode may be prepared using common methods, and specifically, may be prepared by coating a composition for forming a positive electrode active material layer prepared by mixing a positive electrode active material, a conductor and a binder in an organic solvent on a current collector and drying the result, and selectively, compression molding the result on the current collector for enhancing electrode density. Herein, as the organic solvent, those capable of uniformly dispersing the positive electrode active material, the binder and the conductor, and readily evaporating are preferably used. Specifically, acetonitrile, methanol, ethanol, tetrahydrofuran, water, isopropyl alcohol and the like may be included.

A negative electrode according to the present invention is a negative electrode of a lithium-sulfur battery, and includes a negative electrode active material layer and may selectively further include a negative electrode current collector for supporting the negative electrode active material layer.

The negative electrode may use a material capable of reversibly intercalating or deintercalating lithium ions ($Li^+$), a material capable of reversibly forming a lithium-containing compound by reacting with lithium ions ($Li^+$), lithium metal or a lithium alloy as the negative electrode active material. Examples of the material capable of reversibly intercalating or deintercalating lithium ions ($Li^+$) may include crystalline carbon, amorphous carbon or a mixture thereof. Examples of the material capable of reversibly forming a lithium-containing compound by reacting with lithium ions ($Li^+$) may include tin oxide, titanium nitrate or silicon. Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

A binder performs a role of pasting the negative electrode active material, adhering the active materials to each other, adhering the active material and the current collector, and having a buffering effect for expansion and contraction of the active material, and the like. Specifically, the binder is the same as described above in the binder of the positive electrode.

In addition, the negative electrode may be lithium metal or a lithium alloy. As nonlimiting examples, the negative electrode may also be a thin film of lithium metal, or may be an alloy of lithium and one or more types of metals selected from the group consisting of Na, K, Rb, Cs, Fr, Be, Mg, Ca, Sr, Ba, Ra, Al and Sn.

The negative electrode current collector may specifically be selected from the group consisting of copper, stainless steel, titanium, silver, palladium, nickel, alloys thereof and combinations thereof. The stainless steel may be surface treated with carbon, nickel, titanium or silver, and aluminum-cadmium alloys may be used as the alloy. In addition thereto, baked carbon, non-conductive polymers of which surface is treated with a conductor, conductive polymers or the like may also be used.

A common separator may be provided between the positive electrode and the negative electrode. The separator is a physical separator having a function of physically separating electrodes, and those commonly used as a separator may be used without particular limit, and particularly, those having an excellent electrolyte moisture retention ability while having low resistance for ion migration of the electrolyte are preferred.

In addition, the separator enables lithium ion transfer between the positive electrode and the negative electrode while separating and insulating the positive electrode and the negative electrode from each other. Such a separator may be formed with porous, and non-conductive or insulating materials. The separator may be an independent member such as a film, or a coating layer added to the positive electrode and/or the negative electrode.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

The positive electrode, the negative electrode and the separator included in the lithium-sulfur battery may each be prepared using common components and preparation methods, and although not particularly limited thereto, appearances of the lithium-sulfur battery may include a cylinder-type, a square-type, a pouch-type, a coin-type using a can, and the like.

Mode for Invention

Hereinafter, the present invention will be described in detail with reference to examples in order to specifically describe the present invention. However, examples according to the present invention may be modified to various other forms, and the scope of the present invention is not construed as being limited to the examples described below. The examples of the present invention are provided in order to more fully describe the present invention for those having average knowledge in the art.

Example 1

1. Preparation of Liquid Electrolyte

To a solution mixing 1 M $LiN(CF_3SO_2$-dissolved dimethoxyethane and 1,3-dioxolane in a volume ratio of 1:1, polydopamine power was added in 0.1% by weight to prepare a liquid electrolyte. Herein, polydopamine having a particle diameter of 400 nm to 500 nm was used through purification.

2. Manufacture of Lithium-Sulfur Battery

After preparing positive electrode slurry by adding a positive electrode mixture having a composition of 75% by weight of sulfur/carbon composite (S/C composite:sulfur+ Super-P=9:1), 20% by weight of a conductor (Denka black) and 5% by weight of a binder (SBR:CMC=1:1) to D.I water, the result was coated on an aluminum current collector to prepare a positive electrode. Herein, in the binder, SBR is styrene butadiene rubber and CMC is carboxymethyl cellulose.

As a negative electrode, lithium foil having a thickness of approximately 150 μm was used, and as a separator, a polypropylene film having a thickness of 20 μm was used, and a coin cell-shaped lithium-sulfur battery was manufactured by injecting 100 μl of the prepared polydopamine-including liquid electrolyte.

Example 2

A lithium-sulfur battery was manufactured in the same manner as in Example 1, except that a liquid electrolyte including polydopamine powder in 0.25% by weight was used.

Example 3

A lithium-sulfur battery was manufactured in the same manner as in Example 1, except that a liquid electrolyte including polydopamine powder in 0.5% by weight was used.

Example 4

A lithium-sulfur battery was manufactured in the same manner as in Example 1, except that a liquid electrolyte including polydopamine powder in 1.0% by weight was used.

Comparative Example 1

A lithium-sulfur battery was manufactured in the same manner as in Example 1, except that a liquid electrolyte that does not include polydopamine powder was used.

Experimental Example 1

In order to identify a shuttle suppressing effect of the lithium-sulfur batteries manufactured according to Examples 1 to 4 and Comparative Example 1, a charge and discharge test was performed employing a cut-off voltage of 1.5 V to 2.8 V and a C-rate of 0.1 C. Herein, the battery loading was 1.223 $mAh/cm^2$, and the current level was $0.188 \times 10^{-6}$ A when testing at a 0.1 C rate, and results of the charge and discharge test are shown in FIG. 1 to FIG. 5.

It was identified that, as shown in FIG. 1, charging was not completed near 2.3 V to 4 V and a delay reaction is continuously produced when a shuttle reaction occurred, and as shown in FIG. 2 to FIG. 5, charging was properly completed to varying degrees when a shuttle reaction was suppressed. Accordingly, it was identified that a shuttle reaction was suppressed when using a liquid electrolyte including polydopamine.

Experimental Example 2

For the lithium-sulfur batteries manufactured according to Examples 1 to 4 and Comparative Example 1, specific discharge capacity of each of the batteries was measured while repeating 50 cycles of charge/discharge at 0.1 C/0.1 C, respectively. As shown in FIG. 6, it was identified that the lithium-sulfur batteries of Examples 1 to 4 had larger initial capacity compared to the lithium-sulfur battery of Comparative Example 1, and also had enhanced lifecycle properties, and particularly, it was seen that the lithium-sulfur battery of Example 3 exhibited most superior properties.

INDUSTRIAL APPLICABILITY

The lithium-sulfur battery according to the present invention stably exhibits excellent discharge capacity, output property and capacity retention rate, and therefore, is useful in portable devices such as mobile phones, notebook computers, digital cameras and camcorders, and in the fields of electric vehicles such as hybrid electric vehicles (HEV).

Accordingly, according to another embodiment of the present invention, there is provided a battery module including the lithium-sulfur battery as a unit cell, and a battery pack including the same. The battery module or the battery pack may be used as a power supply of any one or more of medium to large-sized devices of power tools; electric vehicles including electric vehicles (EV), hybrid electric vehicles and plug-in hybrid electric vehicles (PHEV); or systems for power storage.

The invention claimed is:
1. A lithium-sulfur battery comprising:
a liquid electrolyte, wherein the liquid electrolyte comprises polydopamine.

2. The lithium-sulfur battery of claim 1, wherein the polydopamine has a particle form having an average particle diameter of 200 nm to 600 nm.

3. The lithium-sulfur battery of claim 1, wherein the polydopamine is included in 0.1% by weight to 1.0% by weight based on a total weight of the whole liquid electrolyte.

4. The lithium-sulfur battery of claim 1, wherein the liquid electrolyte is a non-aqueous liquid electrolyte.

5. The lithium-sulfur battery of claim 1, wherein the liquid electrolyte comprises one or more types of lithium salts selected from the group consisting of LiCl, LiBr, LiI, LiClO$_4$, LiBF$_4$, LiB$_{10}$Cl$_{10}$, LiB(Ph)$_4$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiNO$_3$, chloroborane lithium, lower aliphatic carboxylic acid lithium, lithium tetraphenylborate and lithium imide.

6. The lithium-sulfur battery of claim 1, wherein the liquid electrolyte comprises one or more types of organic solvents selected from the group consisting of N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy franc, 2-methyl tetrahydrofuran, dimethyl sulfoxide, 1,3-dioxolane, 4-methyl-1,3-dioxene, diethyl ether, formamide, dimethylformamide, acetonitrile, nitromethane, methyl formate, methyl acetate, phosphoric acid triester, trimethoxy methane, a dioxolane derivative, sulfolane, methylsulfolane, 1,3-dimethyl-2-imidazolidinone, a propylene carbonate derivative, a tetrahydrofuran derivative, ether, methyl propionate and ethyl propionate.

7. The lithium-sulfur battery of 1, further comprising:
  a positive electrode;
  a negative electrode; and
  a separator provided between the positive electrode and the negative electrode,
    wherein the liquid electrolyte is impregnated into the separator.

* * * * *